(12) United States Patent
Ng et al.

(10) Patent No.: US 7,350,933 B2
(45) Date of Patent: Apr. 1, 2008

(54) PHOSPHOR CONVERTED LIGHT SOURCE

(75) Inventors: Kee Yean Ng, Prai Penang (MY); Heng Yow Cheng, Penang (MY); Janet Bee Yin Chua, Penang (MY)

(73) Assignee: Avago Technologies ECBU IP Pte Ltd, Singapore (SG)

( * ) Notice: Subject to any disclaimer, the term of this patent is extended or adjusted under 35 U.S.C. 154(b) by 142 days.

(21) Appl. No.: 11/135,712

(22) Filed: May 23, 2005

(65) Prior Publication Data

US 2006/0261742 A1 Nov. 23, 2006

(51) Int. Cl.
*F21V 9/16* (2006.01)
(52) U.S. Cl. .................. 362/84; 362/231; 362/800
(58) Field of Classification Search .................. 362/84, 362/231, 35, 34, 230, 545, 293, 800; 313/463; 257/88, 89, 98; 315/169.3, 246; 250/458.1
See application file for complete search history.

(56) References Cited

U.S. PATENT DOCUMENTS

| | | | |
|---|---|---|---|
| 6,345,903 B1 * | 2/2002 | Koike et al. | 362/249 |
| 6,488,390 B1 * | 12/2002 | Lebens et al. | 362/231 |
| 6,517,213 B1 * | 2/2003 | Fujita et al. | 362/84 |
| 6,614,103 B1 * | 9/2003 | Durocher et al. | 257/678 |
| 6,659,623 B2 * | 12/2003 | Friend | 362/249 |
| 6,967,763 B2 * | 11/2005 | Fujii et al. | 359/297 |
| 7,005,679 B2 * | 2/2006 | Tarsa et al. | 257/89 |
| 7,098,588 B2 * | 8/2006 | Jager et al. | 313/498 |
| 7,207,691 B2 * | 4/2007 | Lee et al. | 362/231 |
| 2003/0193796 A1 * | 10/2003 | Heeks et al. | 362/84 |
| 2004/0120140 A1 * | 6/2004 | Fye et al. | 362/84 |
| 2004/0223315 A1 * | 11/2004 | Suehiro et al. | 362/84 |
| 2005/0230700 A1 * | 10/2005 | Stefanov et al. | 257/99 |
| 2006/0138938 A1 * | 6/2006 | Tan et al. | 313/503 |

\* cited by examiner

*Primary Examiner*—Sandra O'Shea
*Assistant Examiner*—Bao Q. Truong

(57) ABSTRACT

A light source having first and second phosphor-converted component light sources is disclosed. The first component light source includes a first LED that emits light at a first wavelength and a first luminescent conversion material layer that converts light of the first wavelength to light of a first output wavelength, and the second component light source includes a second LED that emits light at a second wavelength and a second luminescent conversion material layer that converts light of the second wavelength to light of a second output wavelength that is different from the first output wavelength. The first and second LEDs are constructed in the same material system, preferably in the same batch of wafers on the fabrication line. A controller generates a current through each of the first and second LEDs that results in the light source generating light that is perceived to be a predetermined color.

13 Claims, 4 Drawing Sheets

PHOSPHOR CONVERTED LIGHT SOURCE

BACKGROUND OF THE INVENTION

Light emitting diodes (LEDs) are attractive candidates for replacing conventional light sources such as incandescent lamps and fluorescent light sources. The LEDs have higher electrical-to-light conversion efficiencies and longer lifetimes than incandescent lamps, and do not require the high operating voltages associated with fluorescent light sources. In addition, it is expected that the light conversion efficiencies of LEDs will continue to increase to the point where LEDs will also provide higher conversion efficiencies than fluorescent light sources.

Unfortunately, LEDs produce light in a relatively narrow spectral band. Hence, to produce a light source having an arbitrary color, a compound light source having multiple LEDs is typically utilized. For example, an LED-based light source that provides an emission that is perceived as matching a particular color can be constructed by combining light from red, green, and blue emitting LEDs. The ratio of the intensities of the various colors sets the color of the light as perceived by a human observer.

Unfortunately, the output of the individual LEDs varies with temperature, drive current, and aging. In addition, the characteristics of the LEDs vary from production lot to production lot in the manufacturing process and are different for different color LEDs. Hence, a light source that provides the desired color under one set of conditions will exhibit a color shift when the conditions change or the device ages. To avoid these shifts, some form of feedback system must be incorporated in the light source to vary the driving conditions of the individual LEDs such that the output spectrum remains at the design value in spite of the variability in the component LEDs used in the light source. In one prior art feedback system, a photodiode is provided to monitor the output of each LED and the current through that LED is adjusted to maintain the photodiode output at a preset value.

Such feedback systems increase the cost of the light source. If there is only one LED of each color, a color filter over each LED can be used to restrict the light entering each photodiode to light generated by a particular LED. Unfortunately, many light sources require multiple LEDs of each color to provide a source of sufficient brightness. Positioning the monitoring photodiodes such that each photodiode only measures light from one of the LEDs complicates the design and further increases the cost.

SUMMARY OF THE INVENTION

The present invention includes a light source having first and second component light sources. The first component light source includes a first LED that emits light at a first wavelength and a first luminescent conversion layer that converts light of the first wavelength to light of a first output wavelength, and the second component light source includes a second LED that emits light at the first wavelength and a second luminescent conversion layer that converts light of a second wavelength to light of a second output wavelength, the first output wavelength is different from the second output wavelength. The first and second LEDs are constructed in the same material system. A controller generates a current through each of the first and second LEDs that results in the light source generating light that is perceived to be a predetermined color. In one embodiment, the first and second luminescent conversion layers comprise soluble phosphors that comprise organic phosphors. In one embodiment, the first and second LEDs are fabricated in the same batch of wafers on a fabrication line, and preferably on the same wafer. In one embodiment, the light source includes a photodetector that measures the intensity of light generated by the first and second LEDs. The controller regulates the current through the first and second LEDs to maintain the measured intensity at a predetermined value. In one embodiment, the light source also includes third and fourth component light sources. The third component light source includes a third LED that emits light at a third wavelength and a third luminescent conversion layer that converts light of the third wavelength to light of a third output wavelength, and the fourth component light source includes a fourth LED that emits light at a fourth wavelength and a fourth luminescent conversion layer that converts light of the third wavelength to light of a fourth output wavelength. The third output wavelength is different from the fourth output wavelength. The third and fourth LEDs are constructed in the same material system as the first and second LEDs.

DETAILED DESCRIPTION OF THE PREFERRED EMBODIMENTS OF THE INVENTION

Figure 1:
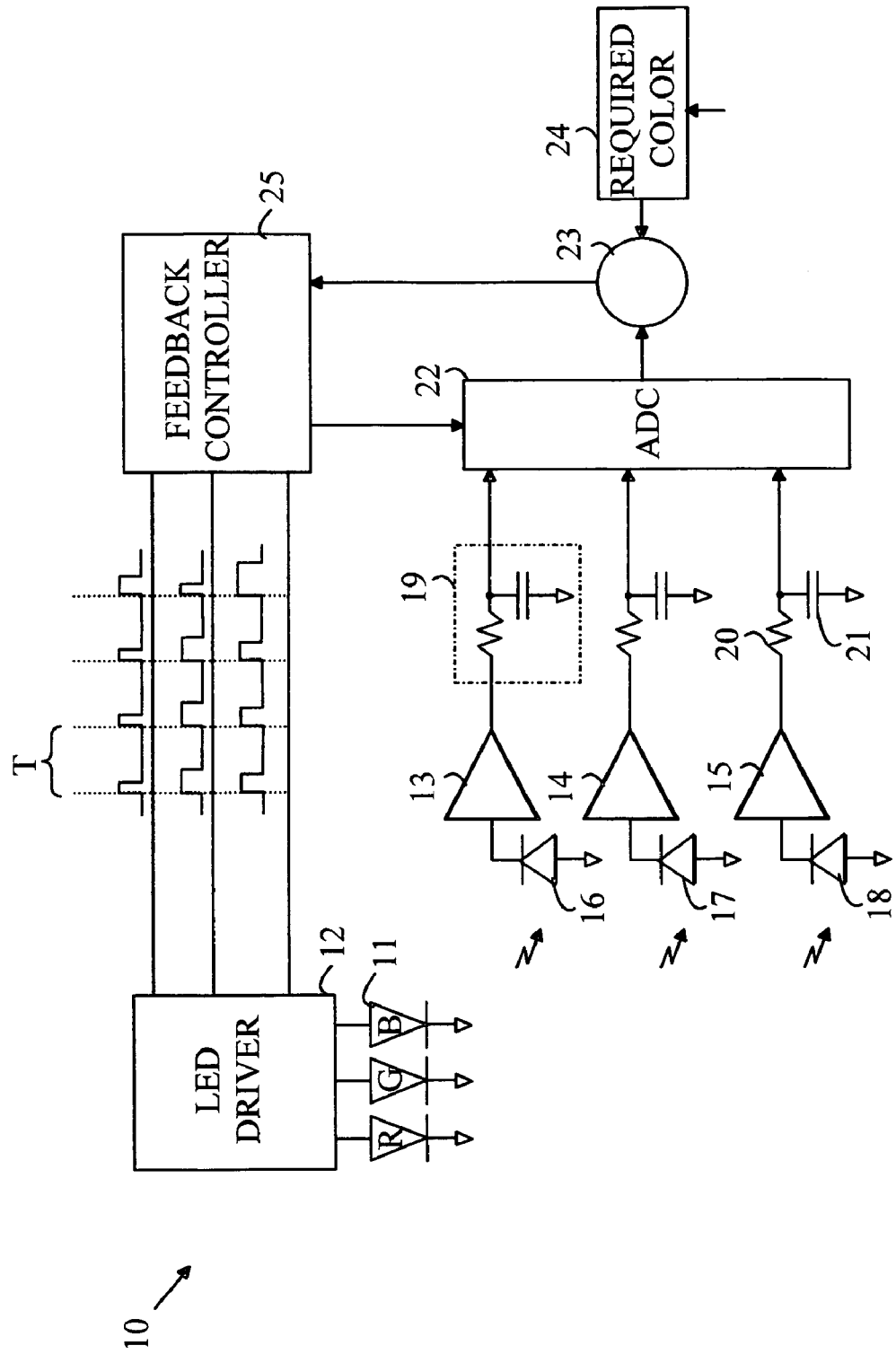
FIG. 1 is a block diagram of a prior art LED light source that utilizes a feedback system to control the duty factor of the individual LEDs to produce a precise output color.

The manner in which the present invention provides its advantages can be more easily understood with reference to FIG. 1. FIG. 1 is a block diagram of a prior art LED light source that utilizes a feedback system to control the duty factor of the individual LEDs to produce a precise output color. Light source 10 utilizes red, green, and blue LEDs 11 to generate light of an arbitrary color. The LEDs are driven by a driver 12 that sets the current through each LED when that LED is "on". In the "on" state, each LED is driven with a predetermined current that is independent of the color being generated by light source 10. The LEDs are driven in a pulsed manner with a cycle time having a period T. During each period, each of the LEDs is turned on for a time t that depends on the color of light that is to be generated by light source 10.

To simplify the following discussion the ratio t/T will be referred to as the duty factor. In principle, the intensity of the light, as seen by a human observer, from each of the LEDs is proportional to t for that LED, provided the period T is sufficiently small. Unfortunately, the LEDs do not turn on and off instantaneously and the light output from any LED may also be a function of the duty factor, since the operating temperature of the LED will increase with increasing duty factors. However, there is a fixed relationship between the desired output color and the duty factors applied to the three LEDs. The relationship is determined continuously by measuring the light that is actually generated and adjusting the duty factors using a servo loop.

Referring again to FIG. 1, light source 10 includes three photodetectors 16-18 that receive a portion of the light leaving the LEDs. The photodetectors include color filters that limit the response of each filter to a wavelength band that is generated by a corresponding one of the LEDs. Each photodetector has a corresponding interface circuit that matches the signal from the corresponding photodetector to a low pass filter. The interface circuits corresponding to photodetectors 16-18 are shown at 13-15, respectively. An exemplary low pass filter is shown at 19. Each low pass filter consists of a resistor 20 and a capacitor 21. The resistor and capacitor values are chosen to average out the on and off cycles such that the outputs of the low pass filters are DC levels representing the intensity of light in each of the three wavelength bands. The output of the low pass filters is digitized using ADC 22 and compared to target values that are stored in a register stack 24 in a subtraction circuit 23 that generates a signal related to the difference of the output of the low pass filter and the target value. The target values represent the three intensities corresponding to the desired output color. The difference between the measured intensities and target intensities provides three error signals that are used by feedback controller 25 to adjust the three corresponding duty factors until the measured output matches the target values.

There are two methods for providing LEDs that emit light in predefined bands of wavelengths. In the first method, the LEDs are fabricated such that the native emission spectrum of each LED is at the desired wavelength. To provide the desired wavelengths, different material systems are often required. Hence, blue LEDs are fabricated in a different material system than red LEDs, and so on. As noted above, the different LEDs have significantly different aging characteristics. In addition, the spectrum emitted by each LED varies with temperature in a manner characteristic of that LED. Hence, a compound light source constructed from a plurality of different LEDs exhibits both color and intensity shifts as the LEDs age.

Figure 2:
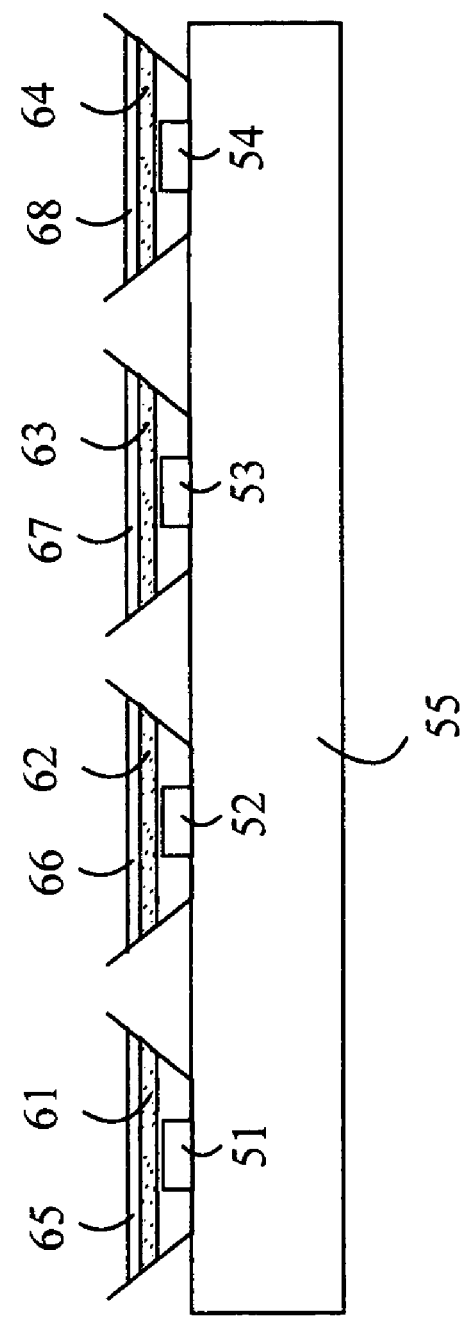
FIG. 2 illustrates a light source 50 according to one embodiment of the present invention.

The second method for providing LEDs utilizes phosphor conversion to convert the native LED emission spectrum to the desired spectrum. Refer now to FIG. 2, which illustrates a light source 50 according to one embodiment of the present invention. Light source 50 utilizes four identical LEDs 51-54 mounted on a substrate 55. Each LED is covered by a corresponding phosphor layer. The phosphor layers corresponding to LEDs 51-54 are shown at 61-64 respectively. Each phosphor layer converts the native light generated by the corresponding LED into light of a different color. As will be explained in more detail below, 4 different colors are utilized to improve the color gamut that can be generated by light source 50.

Figure 4:
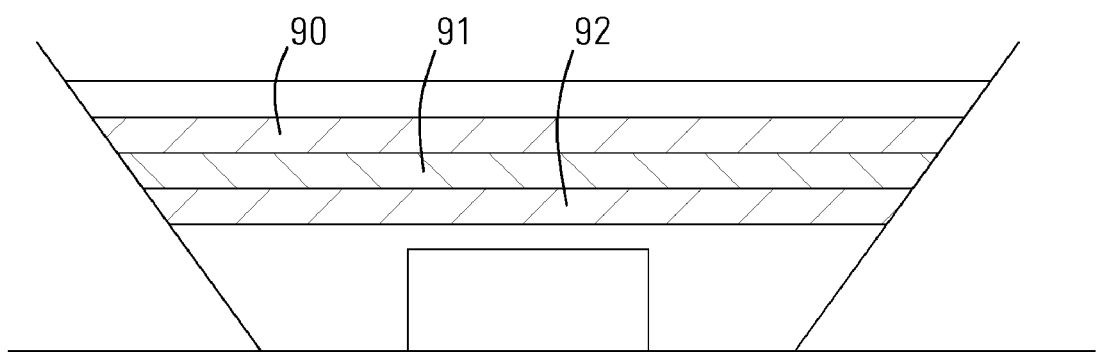
FIG. 4 illustrates a light source according to another embodiment of the present invention.

In one embodiment of the present invention, soluble fluorescent dyes are used for the color conversion. Fluorescent dyes that can be excited by blue light in the 470 nm range are available from Lambda Physik, Inc. of Fort Lauderdale, Fla. For example, Coumarin 6 converts the blue light to green; Fluorol 7GA converts blue light to yellow green light; Rhodamine 110 converts blue light to yellow light, and Pyridine converts the blue light to red. Additional phosphors are available from Osram Sylvania, Inc., of Danvers, Mass. and from Molecular Probes Inc., Eugene Oreg. The dyes can be used in multiple layers (90, 91, 92, FIG. 4) to provide a larger color shift than that available with a single dye. In such an arrangement, the color is shifted upwards at each layer 90, 91, 92 by a small amount, and hence, even though the color-to-color shift of any one dye is small, the overall shift can be substantially larger. Phosphor converted LED sources based on these dyes are discussed in detail in co-pending U.S. patent application Ser. No. 11/025, 450 which is hereby incorporated by reference.

As noted above, the LEDs utilized for the different colors are chosen to have substantially the same aging and temperature characteristics. Hence, LEDs 51-54 are constructed in the same material system and, preferably in the same fabrication batch. The aging and temperature characteristics of LEDs depend on the impurity levels in the various layers. These levels vary from batch to batch even in well-controlled fabrication lines. However, within a given wafer and usually within a given batch, the levels are substantially constant. Hence, the present invention utilizes LEDs that are preferably constructed on the same wafer or at least in the same fabrication batch.

It should be noted that some of the light from the LEDs may not be converted by the luminescent conversion material. The non-converted light can have an adverse effect on the output spectrum of the light source, and hence, in such cases, it is advantageous to provide a filter that blocks this unconverted light from leaving the light source. One method for blocking this unwanted light is to include a filter that blocks the native emission from the LED between the phosphor material and the viewer. Such filters are shown in FIG. 2 at 65-68. However, it will be apparent that a single filter could be placed over the entire light source. Since the LEDs emit light at or near the same wavelengths, a single band blocking filter can be used for all of the LEDs.

While the embodiment shown in FIG. 2 utilizes a light conversion layer of a specific configuration, it should be noted that the present invention is not limited to layers of this configuration. There are a wide range of layer configurations known to the art. For example, thin layers that surround the die have been utilized. Thick layers that encapsulate the die and fill the reflector cup are also known.

Figure 3:
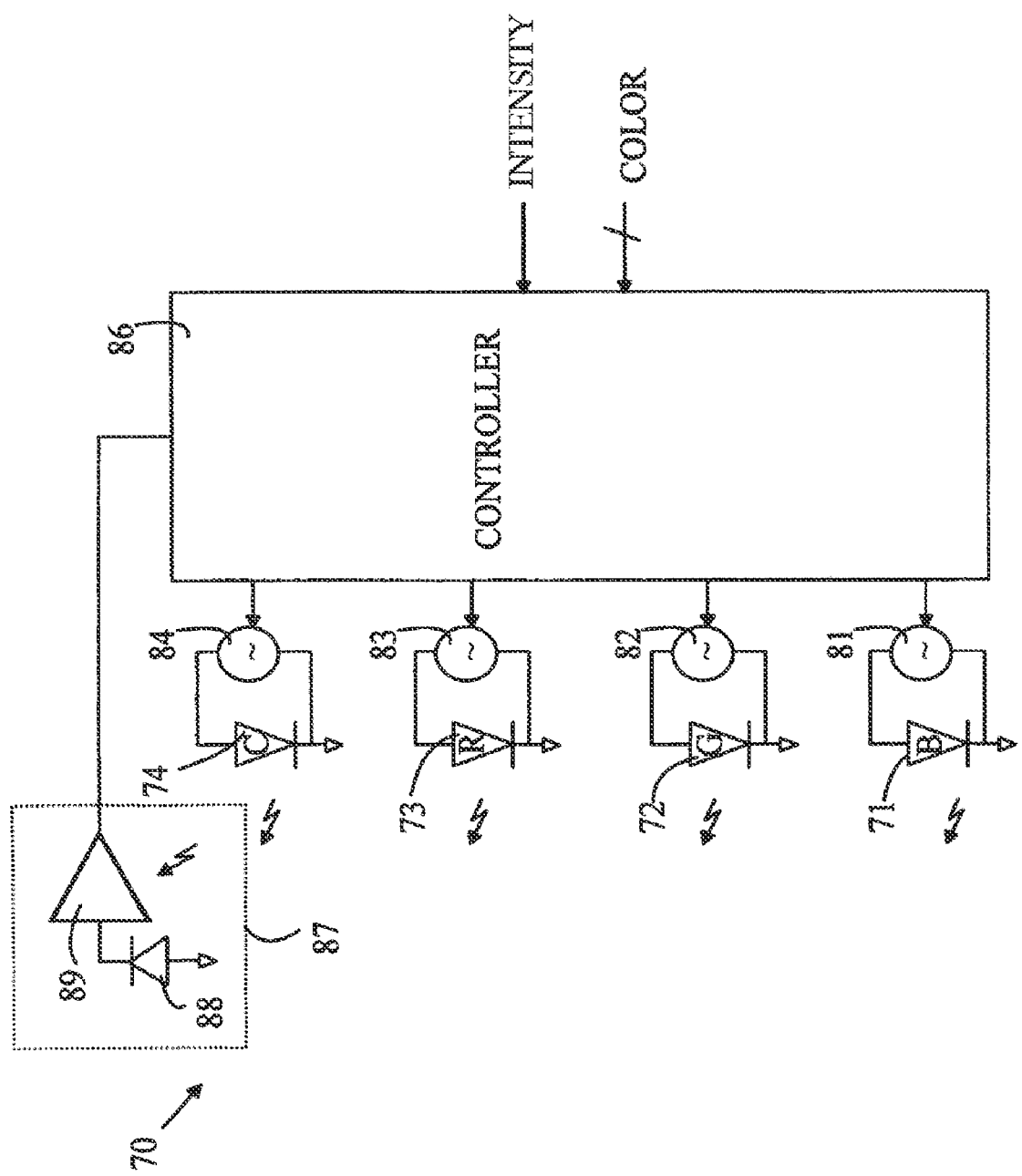
FIG. 3 illustrates a light source 70 according to one embodiment of the present invention.

Refer now to FIG. 3, which illustrates a light source 70 according to one embodiment of the present invention. Light source 70 includes four phosphor converted LED sources 71-74. Each LED source is driven by a constant current source that provides a current that is determined by a control signal supplied by controller 86. The current sources corresponding to LED sources 71-74 are shown at 81-84, respectively. Once the final color to be generated is input to controller 86, controller 86 sets the current from the current sources to provide that color. Since the LEDs in LED sources 71-74 are identical, the sources will age at the same rate, and hence, at most, the intensity of the light source will decrease over time while leaving the color substantially unchanged. A photodetector 87 constructed from photodiode 88 and opamp 89 can be included in the light source to monitor the intensity of light generated by LED sources 71-74. In such systems, controller 86 proportionately increases the current through each of the LEDs to maintain the intensity at the desired level. It should be noted that this control scheme is independent of the number of LEDs of each color, since even if the optional photodetector is included, the controller only needs to monitor the total light output of the collection of sources.

Since controller 86 does not need to compensate for color shifts with aging, the light source can be calibrated at the factory and the calibration curve stored in a non-volatile memory in controller 86. Once calibrated, controller 86 can generate any color within the gamut of the four LED sources given the color's specification in some predetermined standard color scheme such as the 1931 CIE color standard.

As noted above, a light source according to the present invention preferably utilizes four different colored sources to provide better coverage of the color space. Since color generating schemes based on 4 colors are known to the art, the translation of a desired color into the 4 component colors will not be discussed in detail here. While at least 4 colors are preferred, light sources with fewer colors or more colors can be constructed without departing from the teaching of the present invention. For example, if a light source that is to appear white to a human observer is to be constructed, a two color light source consisting of blue and yellow sources may be utilized.

While the above-described embodiments of the present invention utilized soluble phosphors, other forms of phosphors can be utilized without departing from the teachings of the present invention. For example, inorganic phosphor layers for converting light from an LED that emits light of a first wavelength to a second wavelength are well known in the art. Phosphor layers of these materials are typically constructed by suspending particles of the phosphor material in a carrier such as a transparent epoxy. The epoxy is then used to cover the LED die. After covering the die, the uncured epoxy is cured by exposure to heat or light.

While the above-identified embodiments of the present invention utilize phosphors for the conversion of the light from the LEDs to the final colors, any luminescent conversion material can be utilized. For example, quantum dots phosphor, and nano-phosphors could be utilized for the light conversion. For the purposes of this discussion, a luminescent conversion material is any material that converts light of one wavelength to light of another wavelength. These materials include non-linear optical materials that generate light of a shorter wavelength as well as conventional phosphors that generate light of a longer wavelength from the LED light.

As noted above, in the preferred embodiment of the present invention, the LEDs are as nearly identical as possible. That is, the LEDs are from the same batch of wafers on a single production line. However, the present invention provides significant advantages even in the case in which the LEDs have slight differences. For example, the LEDs could be fabricated in different production lines but from the same material system. In this case, the LEDs could have small differences in their output wavelengths. However, such LEDs will still have aging characteristics that are closer to each other than LEDs constructed in different material systems.

Various modifications to the present invention will become apparent to those skilled in the art from the foregoing description and accompanying drawings. Accordingly, the present invention is to be limited solely by the scope of the following claims.

What is claimed is:

1. A light source comprising:
   first and second component light sources, said first component light source comprising a first light emitting diode that emits light at a first wavelength and a first luminescent conversion layer that converts light of said first wavelength to light of a first output wavelength, and said second component light source comprising a second light emitting diode that emits light at a second wavelength and a second luminescent conversion layer that converts light of said second wavelength to light of a second output wavelength, said first output wavelength being different from said second output wavelength, wherein said first and second light emitting diodes are constructed in the same material system and a controller that causes each of said first and second light emitting diodes to generate light in quantities that result in said light source generating light that is perceived as being a predetermined color.

2. The light source of claim 1 wherein said first and second luminescent conversion layers comprise a soluble luminescent conversion material.

3. The light source of claim 2 wherein said luminescent conversion material comprises organic phosphors.

4. The light source of claim 1 wherein said first and second luminescent conversion layers comprise particles of a luminescent conversion material.

5. The light source of claim 4 wherein said luminescent conversion material comprises an inorganic luminescent conversion material.

6. The light source of claim 1 further comprising a filter for blocking light of said first wavelength that is not converted by said first light conversion layer from leaving said light source.

7. The light source of claim 1 wherein said first and second light emitting diodes are fabricated in the same batch of wafers on a fabrication line.

8. The light source of claim 1 wherein said first and second light emitting diodes are fabricated on the same wafer.

9. The light source of claim 1 further comprising a photodetector that measures the intensity of light generated by said first and second light emitting diodes and wherein said controller regulates a current through said first and second light emitting diodes to maintain said measured intensity at a predetermined value.

10. The light source of claim 1 further comprising a third component light source, said third component light source comprising a third light emitting diode that emits light at third wavelength and a third luminescent conversion layer that converts light of said third wavelength to light of a third output wavelength that is different from said first and second output wavelengths, wherein said third light emitting diode is constructed in the same material system as said first and second light emitting diode.

11. The light source of claim 10 further comprising a fourth component light source, said fourth component light source comprising a fourth light emitting diode that emits light at said fourth wavelength and a fourth luminescent conversion material layer that converts light of said fourth wavelength to light of a fourth output wavelength, said fourth output wavelength being different from said first, second, and third output wavelengths, wherein said fourth light emitting diode is constructed in the same material system as said first and second light emitting diodes.

12. The light source of claim 1, wherein said first wavelength and said second wavelength are substantially equal.

13. The light source of claim 1, wherein said first luminescent conversion layer comprises a plurality of luminescent materials applied in a plurality of layers to shift said light of said first wavelength to said light of said first output wavelength in a plurality of steps.

* * * * *